(No Model.)

E. C. COX.
BAKER'S PADDLE.

No. 508,411.   Patented Nov. 14, 1893.

WITNESSES:
H. A. Carhart,
S. May Goodrich.

INVENTOR
Edward C. Cox,
By Smith & Aenison
ATTORNEYS.

UNITED STATES PATENT OFFICE.

EDWARD C. COX, OF SCRANTON, PENNSYLVANIA.

BAKER'S PADDLE.

SPECIFICATION forming part of Letters Patent No. 508,411, dated November 14, 1893.

Application filed May 22, 1893. Serial No. 475,028. (No model.)

*To all whom it may concern:*

Be it known that I, EDWARD C. COX, of Scranton, in the county of Lackawanna, in the State of Pennsylvania, have invented new and useful Improvements in Bakers' Paddles, of which the following, taken in connection with the accompanying drawings, is a full, clear, and exact description.

This invention relates to bakers' paddles.

My object is to produce as a new article of manufacture, a device known in the trade as a baker's paddle, which may be used by bakers with great facility in putting in and taking from the remote parts of a large oven, loaves of bread; cheap and durable in construction and of great utility.

My invention consists in the several novel features of construction and operation hereinafter described and which are specifically set forth in the claim hereunto annexed. It is constructed as follows, reference being had to the accompanying drawings, in which—

Figure 1:
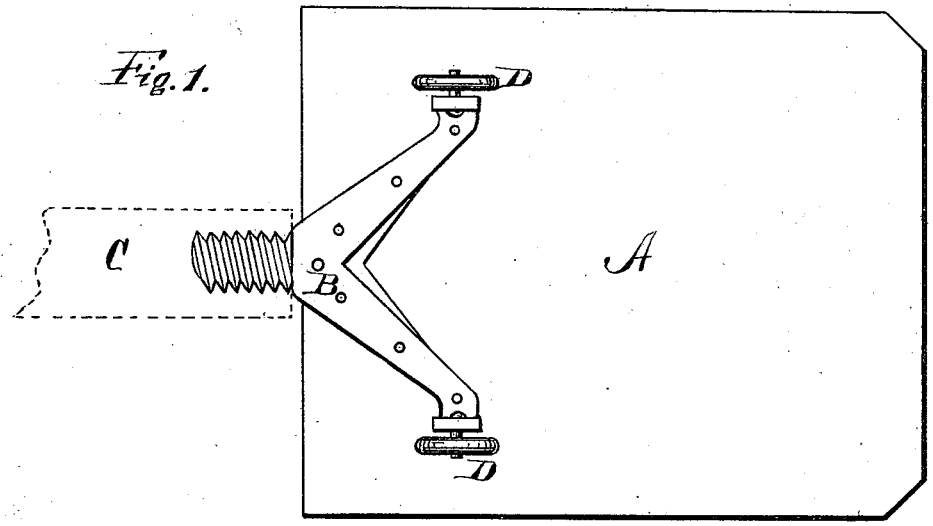
Figure 2:
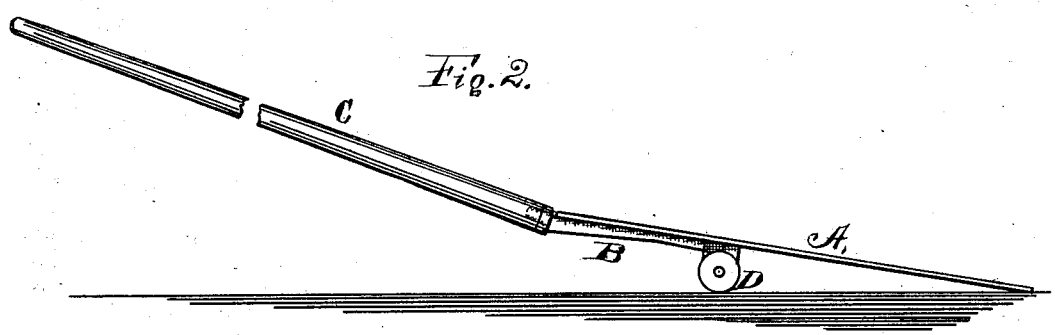

Figure 1, is a bottom plan view of the paddle showing the handle in dotted lines. Fig. 2, is an edge view thereof, as it appears in operation.

A, is the blade constructed of sheet metal, preferably, of any form or size desired, provided with a bracket —B— upon its under side and at one end the bracket is provided with means for securing the handle —C— thereto. The lateral ends of the bracket —B— are provided with rollers —D—.

It will be observed that when in use, the blade will stand upon an incline, as shown in Fig. 2, its outer or forward end resting upon the base or bottom of the oven. Loaves of bread may be placed thereon and when they reach the place in the oven, desired, the paddle may be withdrawn; likewise, the blade, occupying the same position, may be readily shoved under the tiers of bread so that they may be withdrawn with equal facility.

What I claim as my invention, and desire to secure by Letters Patent, is—

A baker's paddle, as a new article of manufacture, comprising a blade having a handle secured thereto, and rollers mounted at or near one end of the blade as set forth.

In witness whereof I have hereunto set my hand this 13th day of May, 1893.

EDWARD C. COX.

In presence of—
THOMPSON BEANE,
A. C. BAILEY.